US011959724B2

(12) United States Patent
Quek

(10) Patent No.: US 11,959,724 B2
(45) Date of Patent: *Apr. 16, 2024

(54) TOY GUN

(71) Applicant: Siew Buan Quek, Min Hang Area (CN)

(72) Inventor: Siew Buan Quek, Min Hang Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,645

(22) Filed: Feb. 2, 2023

(65) Prior Publication Data

US 2023/0175809 A1 Jun. 8, 2023

Related U.S. Application Data

(63) Continuation of application No. 17/454,683, filed on Nov. 12, 2021, now Pat. No. 11,598,603, which is a (Continued)

(30) Foreign Application Priority Data

Apr. 17, 2018 (MY) ............................ PI2018701511

(51) Int. Cl.

| | |
|---|---|
| ***F41B 7/08*** | (2006.01) |
| ***A63H 33/22*** | (2006.01) |
| ***F21V 33/00*** | (2006.01) |
| ***F42B 6/00*** | (2006.01) |
| ***F42B 12/42*** | (2006.01) |
| *F21Y 115/10* | (2016.01) |
| *F21Y 115/30* | (2016.01) |

(52) U.S. Cl.

CPC ............... *F41B 7/08* (2013.01); *A63H 33/22* (2013.01); *F21V 33/008* (2013.01); *F42B 6/00* (2013.01); *F42B 12/42* (2013.01); *F21Y 2115/10* (2016.08); *F21Y 2115/30* (2016.08)

(58) Field of Classification Search

CPC .. F41B 7/08; F41B 11/57; F41B 11/89; F21V 33/00; F21V 33/008; A63H 33/22; F41A 33/02; F42B 6/00; F42B 6/10; F42B 12/38; F42B 12/382; F42B 12/42; F21Y 2115/10; F21Y 2115/30

USPC ........ 124/1, 16, 27, 32, 45, 56, 66; 446/175, 446/219, 401, 473, 484, 485; 473/570

See application file for complete search history.

(56) References Cited

U.S. PATENT DOCUMENTS 2,568,279 A * 9/1951 Walkup .................... F41J 9/165 273/362

2,629,516 A * 2/1953 Badham ................ B05B 9/0838 222/113

(Continued)

*Primary Examiner* — Alexander R Niconovich

(74) *Attorney, Agent, or Firm* — Thompson Patent Law

(57) ABSTRACT

A toy gun capable of illuminating soft projectile being ejected therefrom, comprising a gun body, a grip assembly is fixedly attached to the gun body, and a trigger assembly mounted on the grip assembly. The gun body has a power source, a motor, a launch assembly with a launch tube, a light source and a light reflecting unit. When the trigger assembly of the toy gun is actuated, the power source activates the motor and switches on the light source. The activated motor causes the launch assembly to discharge a soft projectile in the launch tube and the light emitted from the light source is reflected by the light reflecting unit onto the soft projectile once it is discharged, thereby illuminating the soft projectile.

20 Claims, 10 Drawing Sheets

Related U.S. Application Data continuation of application No. 16/987,051, filed on Aug. 6, 2020, now Pat. No. 11,209,237, which is a continuation of application No. 16/654,448, filed on Oct. 16, 2019, now Pat. No. 10,775,127, which is a continuation of application No. 16/162,198, filed on Oct. 16, 2018, now Pat. No. 10,488,146.

(56) References Cited

U.S. PATENT DOCUMENTS

| | | | | | |
|---|---|---|---|---|---|
| 3,114,362 | A * | 12/1963 | Hellman | F41G 1/35 | 362/113 |
| 3,240,924 | A * | 3/1966 | Darby | F21V 33/0064 | 362/112 |
| 3,364,345 | A * | 1/1968 | Davis | F41A 33/02 | 362/281 |
| 3,573,868 | A * | 4/1971 | Giannetti | F41G 3/2655 | 362/112 |
| 4,175,353 | A * | 11/1979 | Pickett | A63J 17/00 | 446/473 |
| 4,239,129 | A * | 12/1980 | Esposito | F41B 9/0018 | 362/112 |
| 4,365,439 | A * | 12/1982 | Litynski | A63H 5/04 | 446/406 |
| 4,542,447 | A * | 9/1985 | Quakenbush | F21V 21/08 | 362/183 |
| 4,750,641 | A * | 6/1988 | Chin-Fu | F41B 9/0037 | 446/475 |
| 4,830,617 | A * | 5/1989 | Hancox | F41A 33/02 | 434/21 |
| 4,910,646 | A * | 3/1990 | Kim | G07D 1/08 | 362/112 |
| 5,415,151 | A * | 5/1995 | Fusi | F42B 12/38 | 124/16 |
| 5,531,210 | A * | 7/1996 | Meiser | F41B 11/642 | 124/66 |
| 5,762,058 | A * | 6/1998 | Cheng | F41A 21/32 | 124/83 |
| 6,048,280 | A * | 4/2000 | Palmer | F41B 11/71 | 124/16 |
| 6,099,316 | A * | 8/2000 | Levy | A63J 5/02 | 434/21 |
| 6,247,995 | B1 * | 6/2001 | Bryan | B05B 7/2472 | 435/189 |
| 6,298,841 | B1 | 10/2001 | Cheng et al. | | |
| 6,474,507 | B1 * | 11/2002 | Hornsby | F41B 9/0028 | 222/113 |
| 6,648,726 | B2 * | 11/2003 | Hornsby | F42B 6/10 | 446/175 |
| 7,004,813 | B2 * | 2/2006 | Zuloff | F41B 7/08 | 446/175 |
| 7,040,308 | B2 * | 5/2006 | Ciesiun | F41B 11/52 | 124/47 |
| 7,434,573 | B2 * | 10/2008 | Orr | F41B 11/57 | 124/32 |
| 7,870,851 | B2 * | 1/2011 | Mahany | F41B 11/68 | 124/56 |
| 7,900,619 | B1 * | 3/2011 | Palmer | F42B 12/42 | 124/16 |
| 7,921,838 | B2 * | 4/2011 | Tippmann, Jr. | F41B 11/62 | 124/75 |
| 8,485,858 | B2 * | 7/2013 | Wei | F41B 11/89 | 446/473 |
| 8,596,255 | B2 * | 12/2013 | Meggs | F42B 6/10 | 124/56 |
| 8,622,247 | B2 * | 1/2014 | Zuloff | F41B 9/0037 | 222/113 |
| 9,067,127 | B2 * | 6/2015 | Clark | F41A 33/02 | |
| 10,234,233 | B1 * | 3/2019 | Spikes | F41B 9/0037 | |
| 10,337,829 | B2 * | 7/2019 | Spielberger | F41G 1/35 | |
| 2005/0016514 | A1 * | 1/2005 | Nadel | F41B 11/642 | 124/56 |
| 2005/0086847 | A1 * | 4/2005 | Paulkovich | F41G 1/35 | 42/114 |
| 2010/0285721 | A1 * | 11/2010 | Ma | F42B 8/12 | 446/485 |
| 2014/0283809 | A1 * | 9/2014 | Huebl | F41B 11/60 | 124/56 |
| 2015/0354918 | A1 * | 12/2015 | Gore | F41B 11/642 | 124/66 |
| 2018/0058799 | A1 * | 3/2018 | Kawawaki | F42B 12/42 | |

* cited by examiner

TOY GUN

CROSS-REFERENCE TO RELATED APPLICATIONS

This application claims the benefit and is a continuation of U.S. application Ser. No. 16/987,051, titled "Toy Gun," filed by Siew Buan Quek on Aug. 6, 2020 and issued as U.S. Pat. No. 11,209,237 on Dec. 28, 2021, which application claims the benefit of and is a continuation of U.S. application Ser. No. 16/654,448, titled "Toy Gun" and filed by Siew Buan Quek on Oct. 16, 2019 and issued as U.S. Pat. No. 10,775,127 on Sep. 15, 2020, which application claims the benefit of and is a continuation of U.S. application Ser. No. 16/162,198, titled "Toy Gun," filed by Siew Buan Quek on Oct. 16, 2018 and issued as U.S. Pat. No. 10,488,146 on Nov. 26, 2019, which claims the benefit of Malaysian Patent Application No. PI2018701511, titled "Toy Gun," filed by Siew Buan Quek on Apr. 17, 2018.

This application incorporates the entire contents of the foregoing application(s) herein by reference.

TECHNICAL FIELD

The present invention relates to a toy gun, and more particularly to a toy gun capable of creating a visual effect of an illuminated soft projectile being ejected therefrom.

BACKGROUND

Toy guns are popular among children and young adults and are commonly used in games and sports activities such as hunting games, combat or war games. Toy guns are typically designed to be externally resembled real guns and are accompanied with fanciful light and sound effects in order to create a sense of reality and to make the toy guns to be more appealing to the players.

Nevertheless, conventional toy guns are seldom to be employed in the dark since players are not able to see the effects of projectiles being shot from the toy guns, thereby reducing the degree of excitement and amusement effects of playing toy guns in the dark. Enhancements have been carried out to include the feature of glowing projectiles for toy guns in recent years so as to enable players to play shooting games in a dark environment. It is noted that the glowing projectiles of these toy guns are typically coated with fluorescent or phosphorescent pigments and prior exposure to a light source is required before the projectiles are expelled from the toy guns so as to achieve the desired glowing effect. One of the shortcomings of the existing glowing projectiles is the requirement of exposing the projectiles to a light source to illuminate the projectiles before a game can be started. This would create inconvenience to the players since a game cannot be started immediately due to longer preparation time is required to expose the projectiles to a light source. Further, insufficient or uneven exposure of the projectiles to the light source would also cause the projectiles to be unable to give the desired glowing effect after being expelled from the toy guns and thus reduces the overall excitement of a game.

In view of these and other shortcomings, it is desirous to provide a toy gun with sufficient realism and is capable of creating a visual effect of an illuminated soft projectile which simulates a space weapon without the need of exposing the soft projectile to a light source in advance, thereby reducing the preparation time.

The toy gun according to the preferred embodiments of the present invention and its combination of elements and/or arrangement of parts or components thereof will be described and/or exemplified in the detailed description.

SUMMARY

The present invention relates to a toy gun capable of creating a visual effect of an illuminated soft projectile being ejected therefrom. The toy gun comprises a gun body and a grip assembly fixedly attached to the gun body. Preferably, the gun body is configured to accommodate a power source, a motor, a launch assembly with a launch tube connected thereto, a light source and a light reflecting unit. The toy gun is provided with a trigger assembly mounted on the grip assembly of the toy gun.

In accordance with each of the preferred embodiments of the present invention, the motor, the light source and the trigger assembly of the toy gun are controllably connected to the power source of the toy gun. It should be noted that the power source of the toy gun is configured to activate the motor and switch on the light source when the trigger assembly of the toy gun is actuated. According to each of the preferred embodiments, the launch assembly of the toy gun is operatively connected to the motor. It should be noted that the launch tube connected to the launch assembly is configured to receive and hold at least one soft projectile to be discharged. In each of the preferred embodiments of the present invention, when the motor is activated by the power source, the activated motor operably causes the launch assembly to discharge the soft projectile contained within the launch tube of the toy gun. In accordance with each of the preferred embodiments of the present invention, the light source and the light reflecting unit of the toy gun are preferably positioned at a front position of the gun body. The light reflecting unit of the toy gun of the present invention is configured to reflect the light beam emitted from the light source once the soft projectile is discharged from the launch tube.

In a preferred embodiment of the present invention, the light reflecting unit is preferably a triangular prism. In this preferred embodiment, the triangular prism is preferably positioned above the light source of the toy gun. In a further preferred embodiment of the present invention, the light reflecting unit is preferably a flippable mirror. In this preferred embodiment, the flippable mirror is preferably positioned beneath the light source of the toy gun. Preferably, the flappable mirror is configured to flip downwards at substantially 45 degrees once the soft projectile is discharged from the launch tube so as to reflect the light beam emitted from the light source.

It should be noted that in any of the aforementioned embodiments, the light beam emitted from the light source is preferably reflected at substantially 90 degrees by the light reflecting unit. It will be appreciated that the light beam reflected by the light source will axially align with the soft projectile discharged from the launch tube of the toy gun and thereby illuminating the soft projectile.

According to the present invention, the toy gun is provided with a detachable projectile magazine. In the preferred embodiment, the projectile magazine of the toy gun is preferably positioned outside the gun body. Preferably, the projectile magazine is resided on an upper surface of the gun body in a detachable manner. It should be noted that the projectile magazine of the toy gun is configured to hold and contain a plurality of soft projectiles.

The toy gun of the present invention is further provided with an audio speaker means. It should be noted that the audio speaker means of the toy gun is configured to generate sound effects simulating the actual blaster shot so as to make the toy gun more lifelike and interesting to the players. The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

Like reference symbols in the various drawings indicate like elements.

DETAILED DESCRIPTION OF ILLUSTRATIVE EMBODIMENTS

Figure 1:
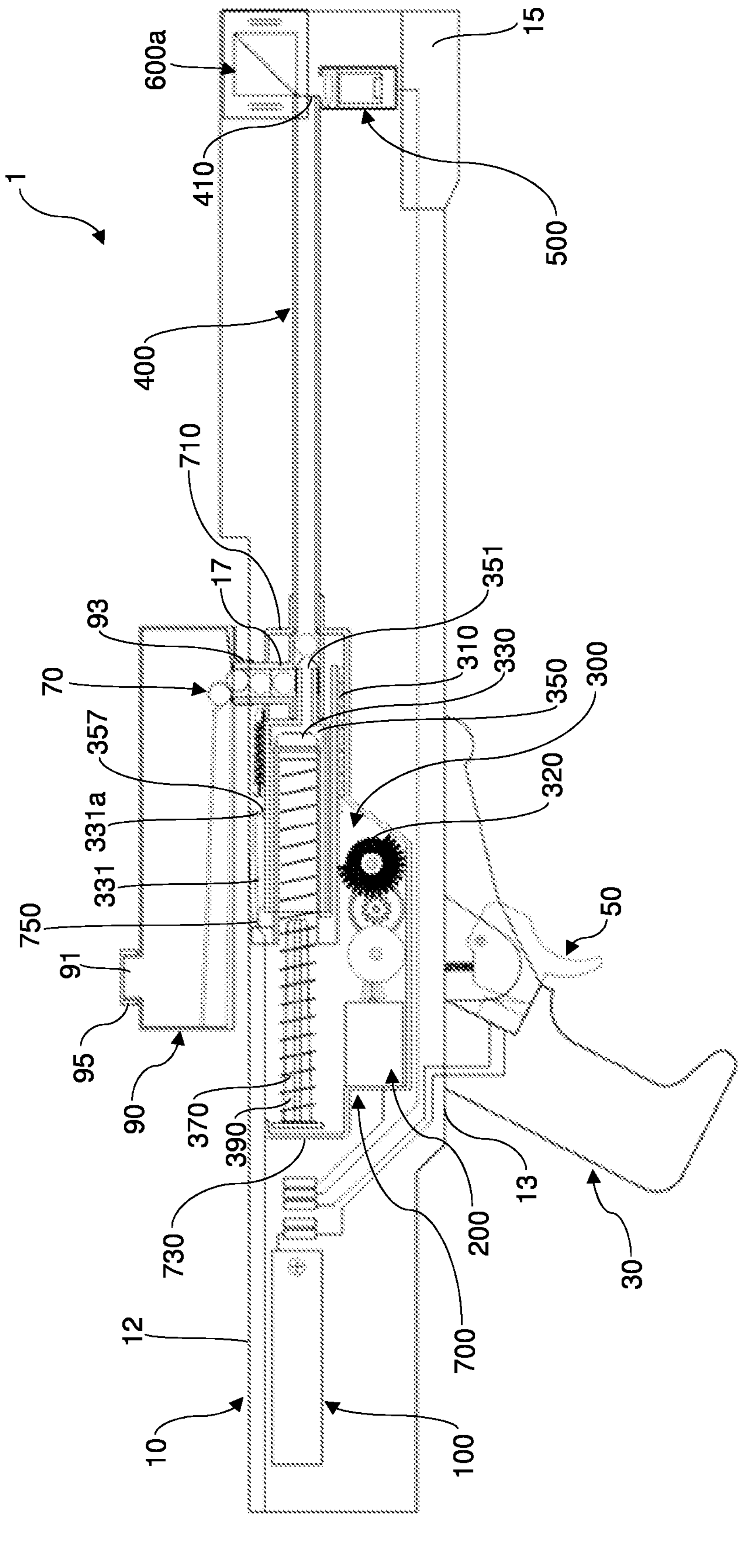
FIG. 1 is a sectional view of a toy gun in accordance with a preferred embodiment of the present invention.

The present invention relates to a toy gun capable of creating a visual effect of an illuminated soft projectile which simulates a space weapon without the need of exposing the soft projectile to a light source prior the soft projectile is being discharged from the toy gun.

Hereinafter, this specification will describe the present invention according to preferred embodiments. However, it is to be understood that limiting the description to the preferred embodiments of the invention is merely to facilitate discussion of the present invention and is in no way intended to limit the invention, its application, or uses and it is envisioned that those skilled in the art may devise various modifications and equivalents without departing from the scope of the appended claims.

In the description of embodiments disclosed herein, any reference to direction or orientation is merely intended for convenience of description and is not intended in any way to limit the scope of the present invention. Relative terms such as "upper", "lower", "front", "rear" and "top" as well as derivative thereof (for example, "backwardly", "forwardly", "rearwardly", etc.) should be construed to refer to the orientation as then described or as shown in the drawings under discussion. These relative terms are for convenience of description only and do not require that the apparatus be constructed or operated in a particular orientation.

The toy gun of the present invention will now be described in accordance to the accompanying drawings FIGS. 1 to 10, either individually or in any combination thereof. Referring to FIGS. 1 to 10, preferred embodiments of a toy gun 1 in accordance with the present invention are depicted. It should be noted that certain elements or parts of the toy gun 1 of the present invention are common to the depicted embodiments and are commonly numbered in FIGS. 1 to 10. The toy gun 1 of each of the preferred embodiments of the present invention comprising a gun body 10 and a grip assembly 30 as illustrated in FIGS. 1 and 5. The grip assembly 30 is configured to be fixedly attached to a lower surface 13 of the gun body 10. In each of the preferred embodiments of the present invention, the toy gun 1 is provided with a trigger assembly 50. The trigger assembly 50 is preferably mounted on the grip assembly 30 as illustrated in FIGS. 1 and 5.

According to each of the preferred embodiments of the present invention, the gun body 10 is configured to accommodate a power source 100, a motor 200, a launch assembly 300, a launch tube 400, a light source 500 and a light reflecting unit. In each of the preferred embodiments, the launch tube 400 of the toy gun 1 is preferably connected to the launch assembly 300 as illustrated in FIGS. 1 and 5. It should be noted that the launch tube 400 is configured to receive and hold at least one soft projectile 70 to be discharged from the toy gun 1.

In accordance with each of the preferred embodiments of the present invention, the motor 200, the light source 500 and the trigger assembly 50 of the toy gun 1 are controllably connected to the power source 100 contained within the gun body 10 as illustrated in FIGS. 1 and 5. It should be noted that when the trigger assembly 50 is manually actuated by a player, the power source 100 activates the motor 200 and switches on the light source 500 of the toy gun 1. By way of example but not limitation, the power source 100 of the toy gun 1 is preferably battery or any other suitable power sources. In each of the preferred embodiments of the present invention, the launch assembly 300 is operatively connected to the motor 200. It should be noted that activation of the motor 200 by the power source 100 due to the actuation of the trigger assembly 50 operatively causes the launch assembly 300 to discharge the at least one soft projectile 70 from the launch tube 400.

Preferably, the launch assembly 300 of the toy gun 1 of the present invention is contained within a chamber 700 having a front end 710 and a rear end 730 as illustrated in FIGS. 1 and 5. In each of the preferred embodiments of the present invention, the launch assembly 300 of the toy gun 1 includes a rack and pinion assembly. If desired, the launch assembly 300 of the toy gun 1 of the present invention can also include other suitable linear motion converters. The rack and pinion assembly of the launch assembly 300 is operatively connected to a piston 330 disposed within a cylinder 350 as illustrated in FIGS. 1 and 5. Preferably, the cylinder 350 is having a nozzle 351 in communication with the launch tube 400 of the toy gun 1.

According to each of the preferred embodiments of the present invention, the rack 310 of the rack and pinion assembly is preferably attached to a lower side 333 of the piston 330 and is configured to engage with the pinion 320 of the rack and pinion assembly.

Figure 2:
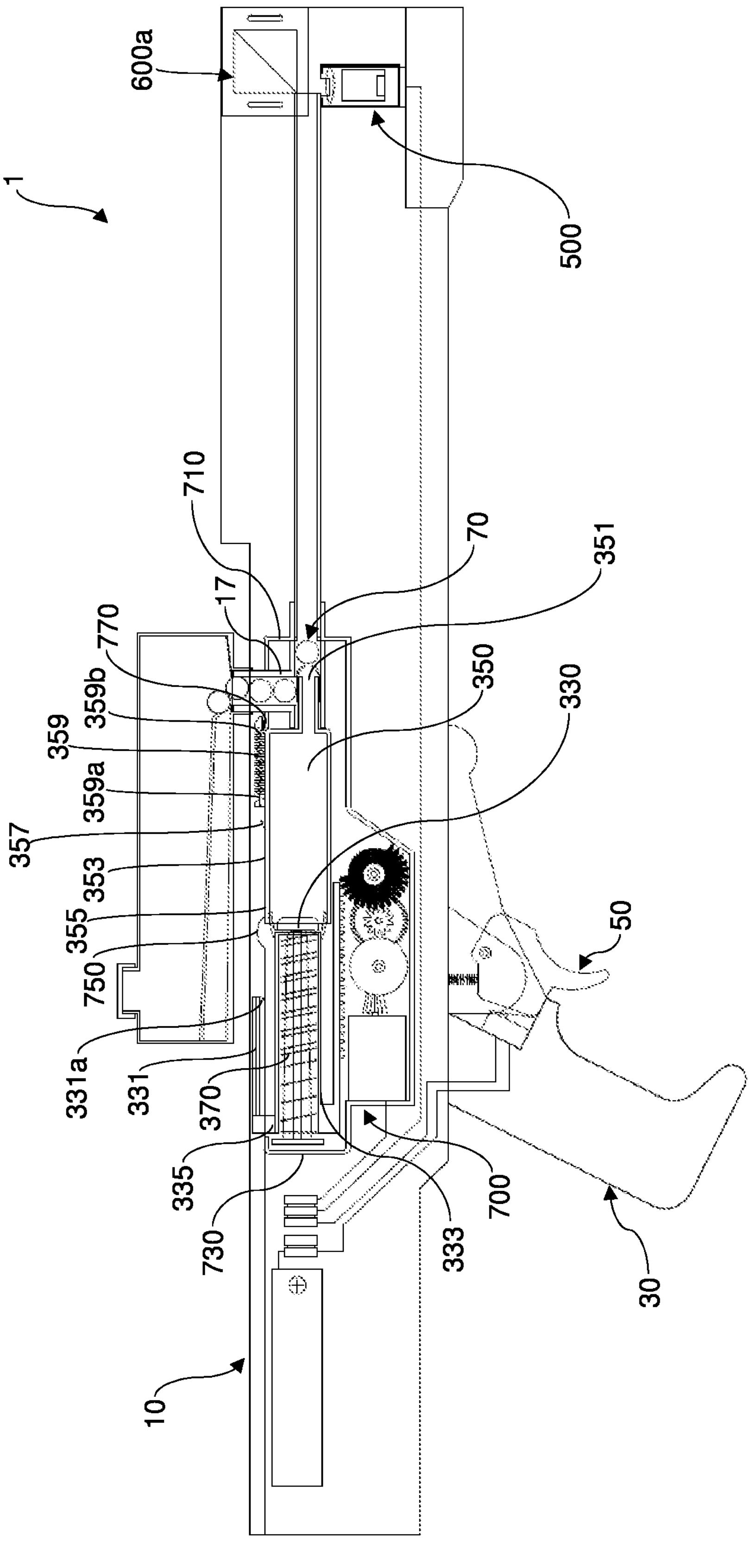
FIG. 2 is a sectional view of a toy gun showing a coil spring is being compressed by a piston in accordance with a preferred embodiment of the present invention.
Figure 7:
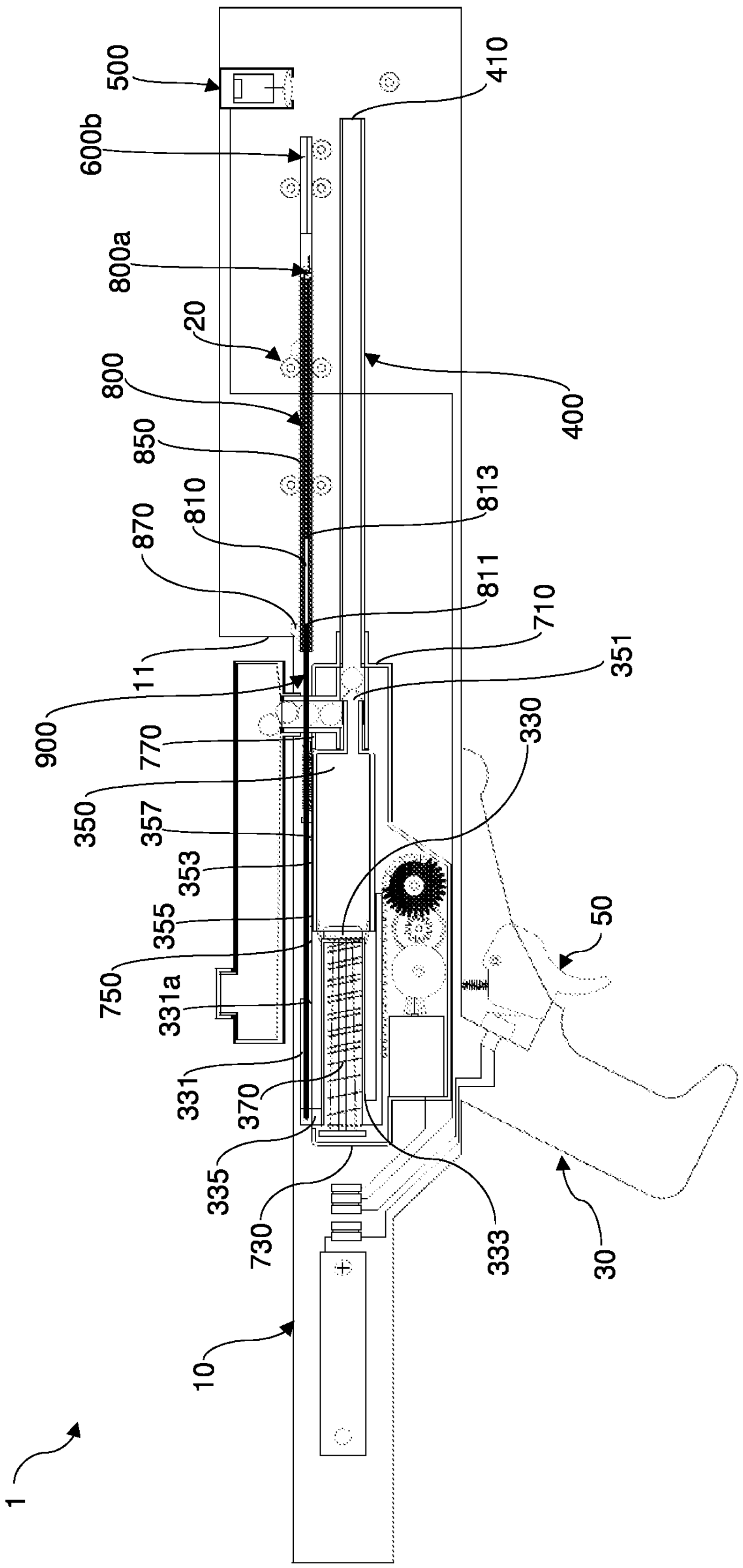
FIG. 7 is a sectional view of a toy gun showing a coil spring is being compressed by a piston in accordance with a further preferred embodiment of the present invention.

In each of the preferred embodiments, the activated motor 200 causes the pinion 320 to rotate and subsequently drive the rack 310 so as to move the piston 330 in a rearward direction. It should be noted that when the piston 330 is moved rearwardly, air is being drawn into the cylinder 350 through the nozzle 351 of the cylinder 350 and the drawn air is subsequently being compressed in the cylinder 350 after the nozzle 351 of the cylinder 350 is sealed by the at least one soft projectile 70 loaded into the launch tube 400 of the toy gun 1. In each of the preferred embodiments of the present invention, the pinion 320 is preferably a half gear having a toothed half circumference and a smooth half circumference. It should be noted that the toothed half circumference of the pinion 320 is configured to engage with the rack 310 so as to move the piston 330 backwardly while the smooth half circumference of the pinion 320 is configured to trigger the piston 330 to move forwardly by a coil spring 370. According to each of the preferred embodiments of the present invention, one end of the coil spring 370 is preferably secured to the piston 330 and another end of the coil spring 370 is preferably secured to an anchor member 390 positioned at the rear end 730 of the chamber 700 as illustrated in FIGS. 1 and 5. It should be noted that the coil spring 370 is being compressed when the piston 330 moves in a rearward position as illustrated in FIGS. 2 and 7 and when the smooth half circumference of the pinion 320 opposes the rack 310, the compressed coil spring 370 is released to expand to the released state so as to drive the piston 330 in a forward direction. The piston 330 in turn forces the compressed air in the cylinder 350 into the launch tube 400 through the nozzle 351, thereby discharging the at least one soft projectile 70 loaded therein.

Figure 3:
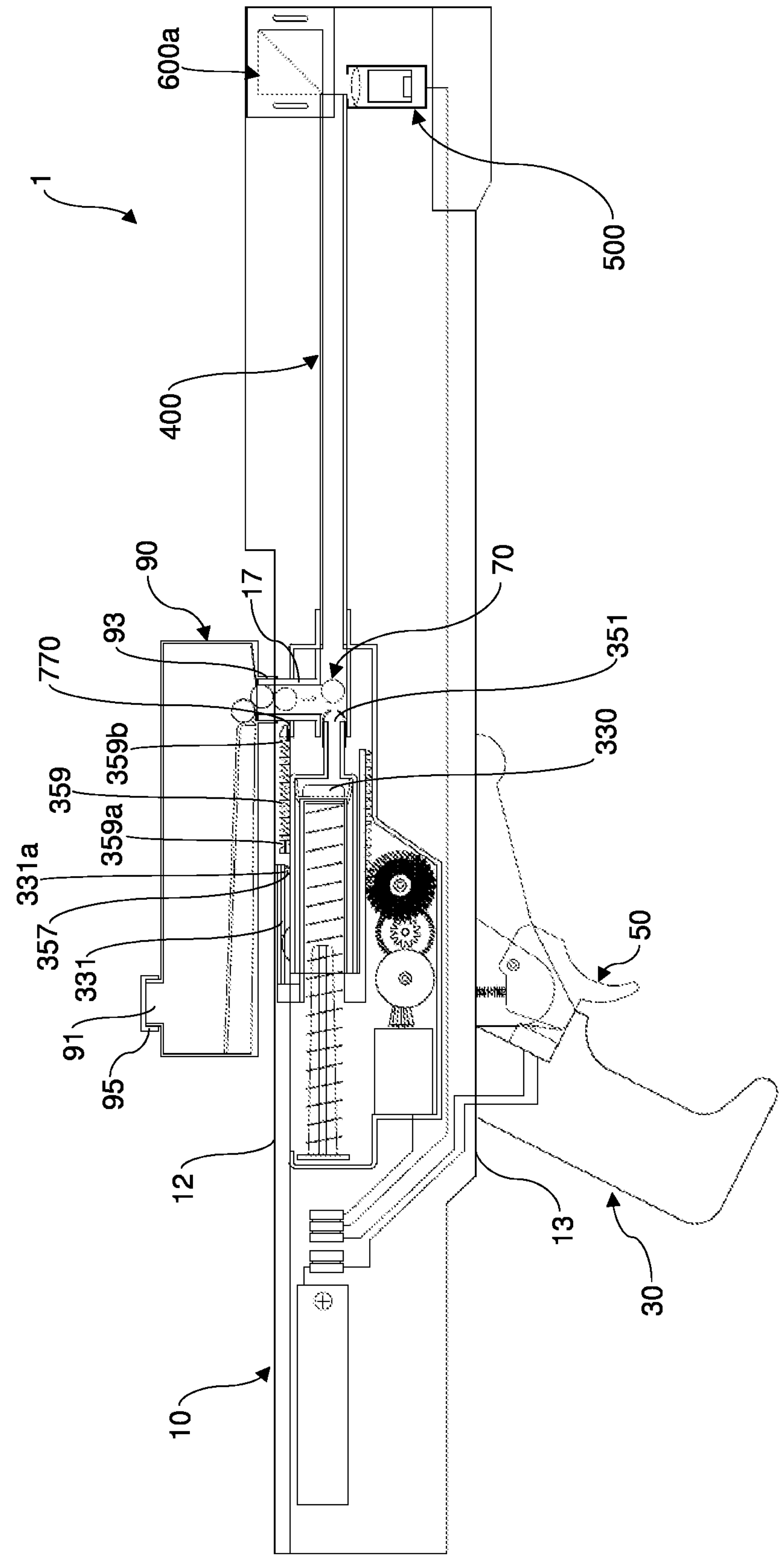
FIG. 3 is a sectional view of a toy gun showing a soft projectile is being loaded into a launch tube in accordance with a preferred embodiment of the present invention.
Figure 9:
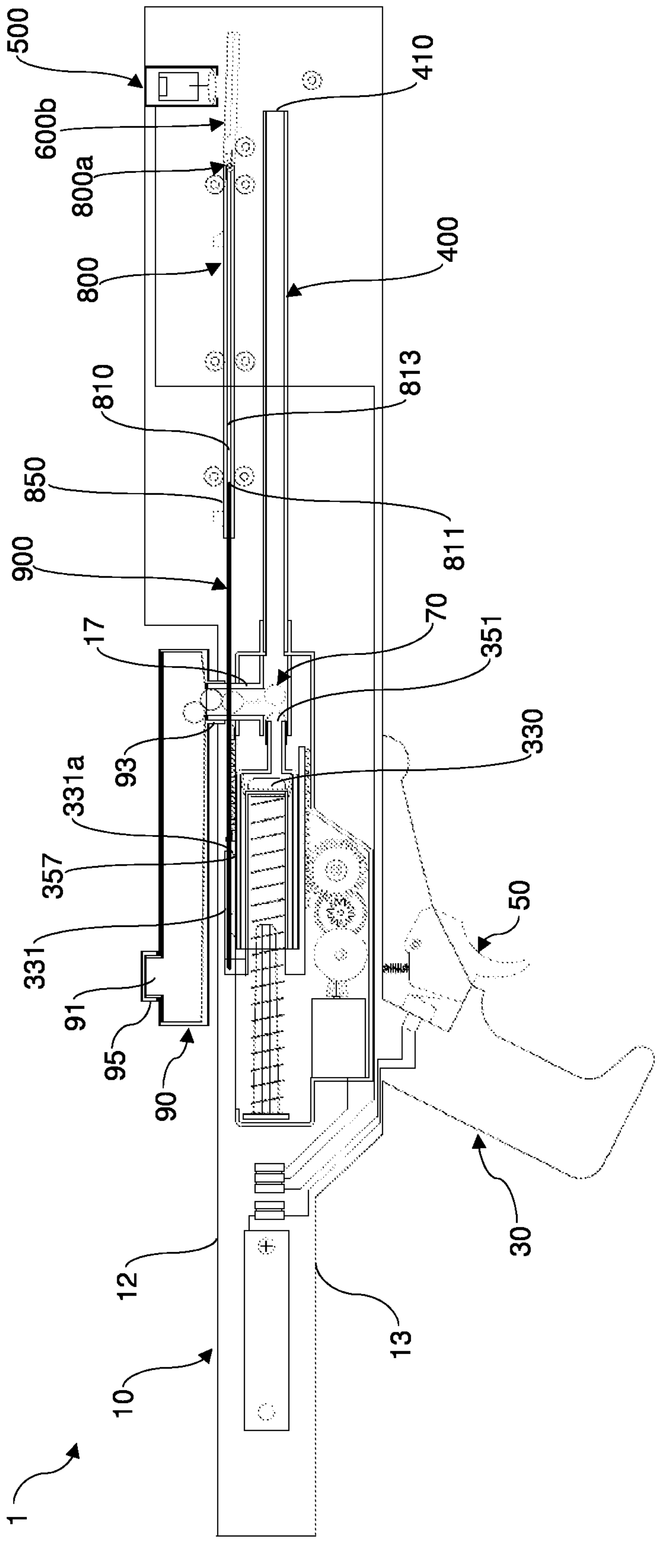
FIG. 9 is a sectional view of a toy gun showing a soft projectile being loaded into a launch tube in accordance with a further preferred embodiment of the present invention.

In accordance with each of the preferred embodiments of the present invention, the piston 330 is provided with a hook 331 having a hook tip 331*a* as illustrated in FIGS. 1 and 5. The hook 331 is preferably formed and extended from a rear end portion 335 of the piston 330. In each of the preferred embodiments, the hook 331 of the piston 330 is preferably resided outside the cylinder 350. It should be noted that the hook tip 331*a* of the hook 331 is configured to detachably engage with a corresponding appendage 357 formed on an outer surface 353 of the cylinder 350 as illustrated in FIGS. 1, 2, 5 and 7. It should be noted that when the piston 330 moves in a rearward position, the cylinder 350 is being pulled backward by the hook 331 of piston 330 which consequently causes the nozzle 351 of the cylinder 350 to move backwardly. The backward movement of the nozzle 351 of the cylinder 350 exposes a passage 17 positioned on top of the nozzle 351 of the cylinder 350, thereby allowing the at least one soft projectile 70 contained in the passage 17 to enter into the launch tube 400 as illustrated in FIGS. 3 and 9.

Figure 6:
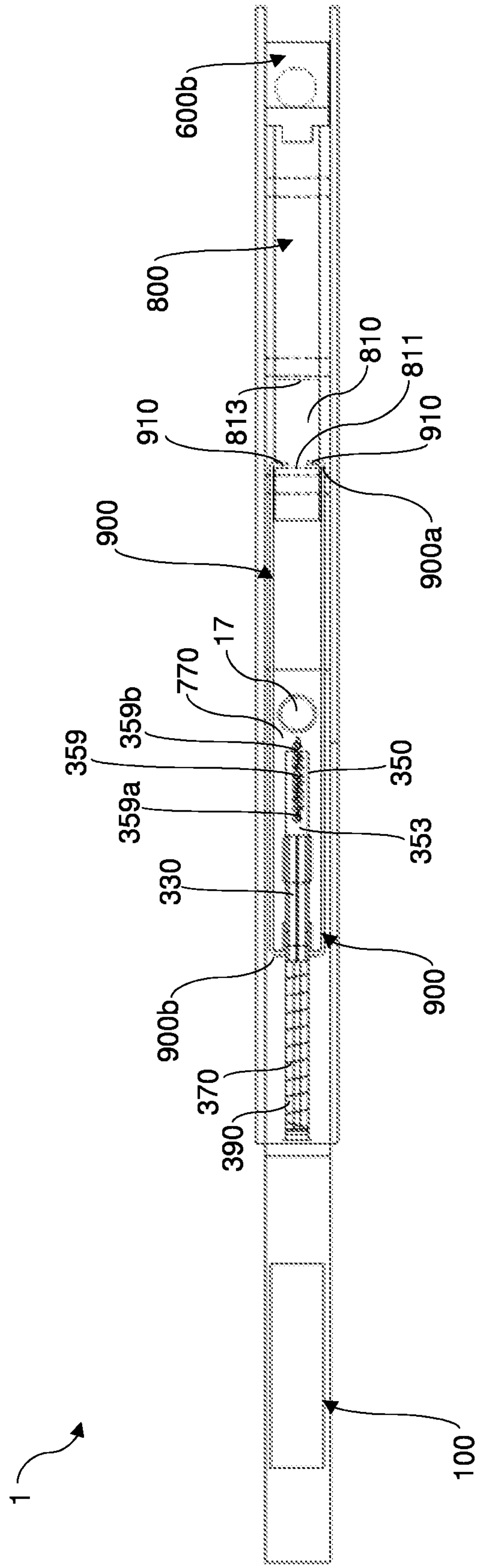
FIG. 6 is a top plan view of a toy gun in accordance with a further preferred embodiment of the present invention.

In each of the preferred embodiments of the present invention, the chamber 700 of the toy gun 1 is provided with a protuberance 750. Preferably, the protuberance 750 is positioned proximate a rear end position 355 of the cylinder 350 and is spaced apart from the appendage 357 of the cylinder 350 as illustrated in FIGS. 2 and 7. In accordance with each of the preferred embodiments of the present invention, the protuberance 750 of the chamber 700 is configured to dislodge the engagement between the hook tip 331*a* of the hook 331 of the piston 330 and the appendage 357 of the cylinder 350. It should be noted that when the piston 330 moves in rearward direction, the hook tip 331*a* of the hook 331 and the appendage 357 of the cylinder 350 will be in surface contact with the protuberance 750 of the chamber 700 in which the protuberance 750 of the chamber 700 will obstruct the movement of the appendage 357 of the cylinder 350 while lift the hook tip 331*a* of the hook 331 from the appendage 357 of the cylinder 350 so as to release the hook tip 331*a* of the hook 331 from the appendage 357 of the cylinder 350. Preferably, the protuberance 750 of the chamber 700 is positioned at a location sufficient for the cylinder 350 to move backward so as to expose the passage 17, thereby allowing the at least on soft projectile 70 to be loaded into the launch tube 400. According to each of the preferred embodiments of the present invention, the cylinder 350 is returned to the original position by a spring 359 when the hook tip 331*a* of the hook 331 of the piston 330 is disengaged from the appendage 357 of the cylinder 350. Preferably, one end 359*a* of the spring 359 is attached to the outer surface 353 of the cylinder 350 and another end 359*b* of the spring 359 is secured to an upper side wall 770 of the chamber 700 as illustrated in FIGS. 3 and 6.

In each of the preferred embodiments of the present invention, the nozzle 351 of the cylinder 350 is preferably provided with a cushioning element so as to reduce the impact force exerted on the at least one soft projectile 70 when the nozzle 351 of the cylinder 350 is in surface contact with the at least one soft projectile 70 after the cylinder 350 is returned to its original position, thereby ensuring the at least one soft projectile 70 could remain intact prior being discharged from the launch tube 400. By way of example but not limitation, the cushioning element may be made of foam rubber or any other suitable cushioning materials.

In each of the preferred embodiments of the present invention, the light source 500 of the toy gun 1 is configured to generate and emit light beam. By way of example but not limitation, the light source 500 of the toy gun 1 is preferably laser. If desired, the light source 500 of the toy gun 1 can also include any other suitable light sources such as light-emitting diode (LED) light. In the preferred embodiment, the light beam emitted by the light source 500 is reflected by the light reflecting unit of the toy gun 1 once the at least one soft projectile 70 is discharged from the launch tube 400 by the launch assembly 300 of the toy gun 1. Preferably, the light source 500 and the light reflecting unit are positioned at a front position 15 of the toy gun 1 as illustrated in FIGS. 1 and 5.

Figure 4:
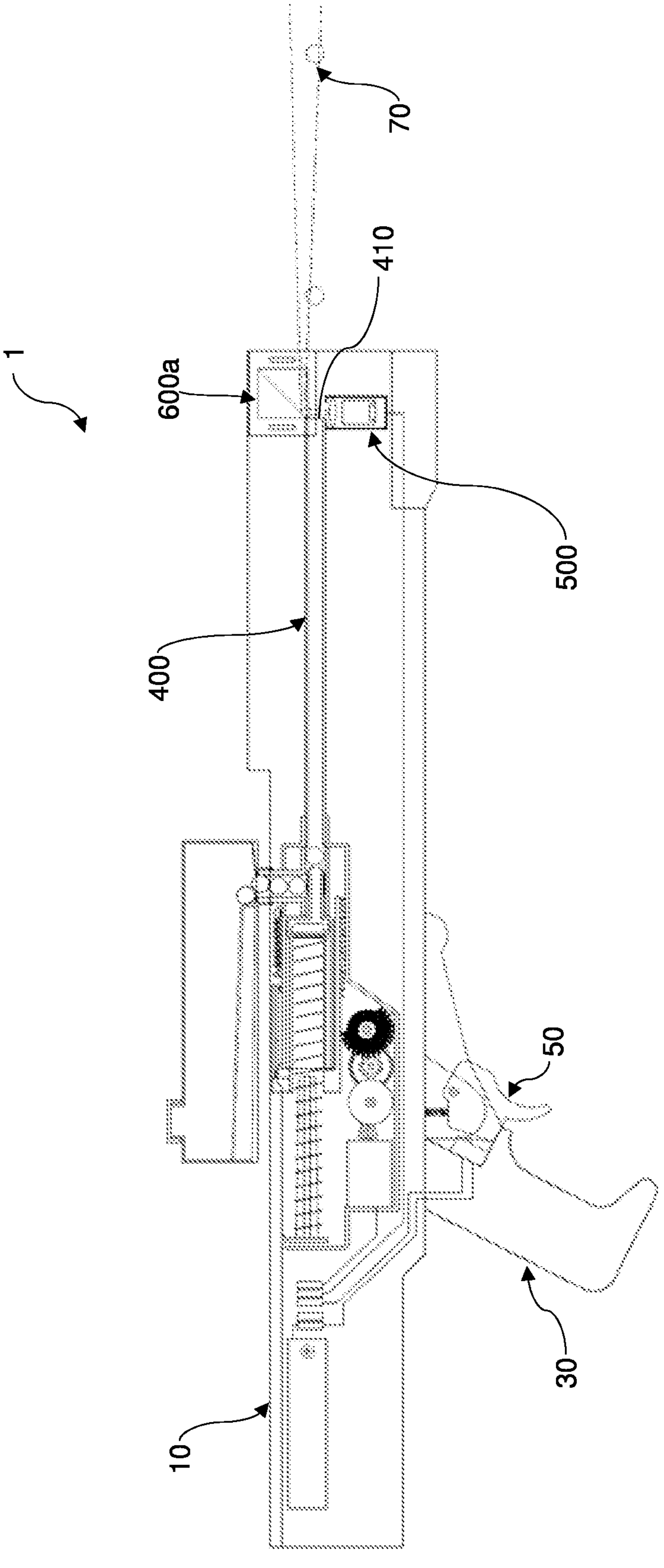
FIG. 4 is a sectional view of a toy gun showing a soft projectile being discharged from a launch tube and the discharged soft projectile is illuminated by a light beam reflected by a light reflecting unit in accordance with a preferred embodiment of the present invention.
Figure 5:
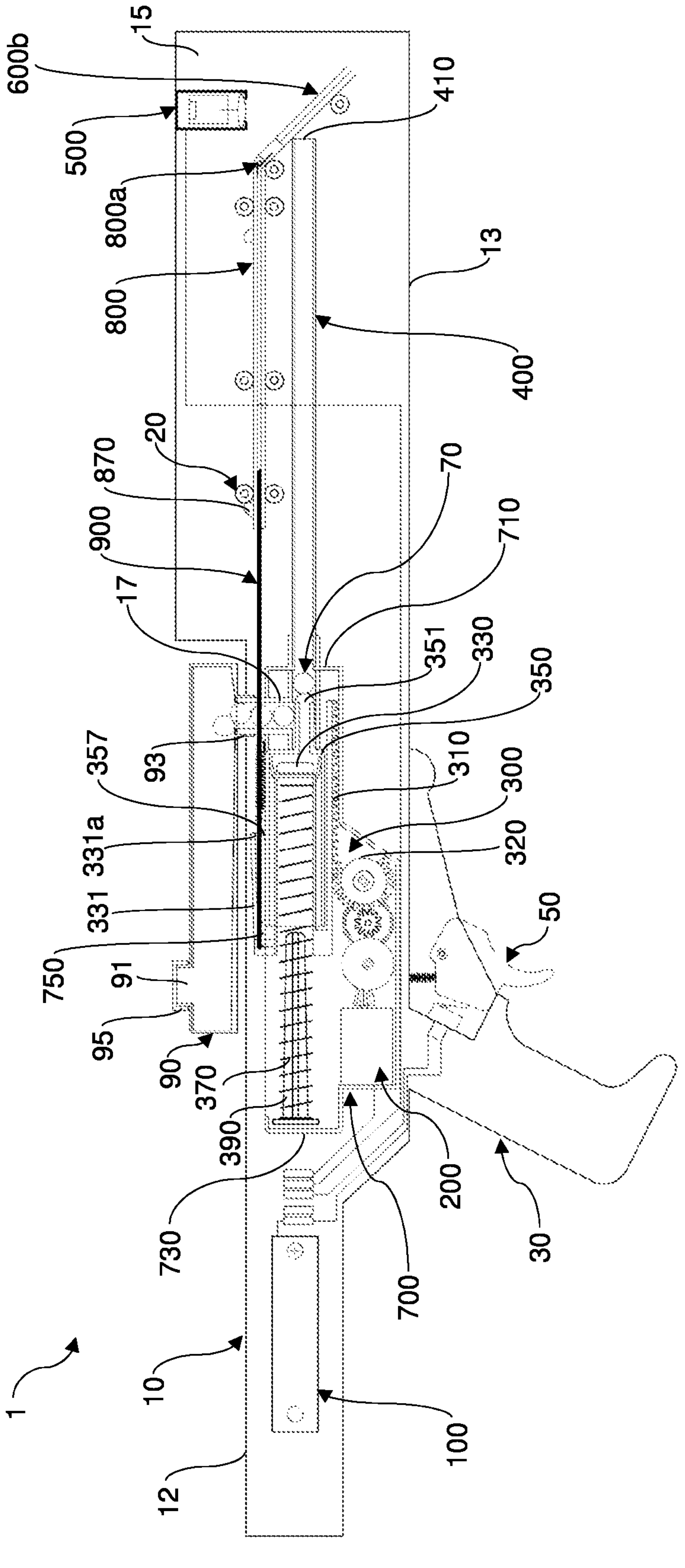
FIG. 5 is a sectional view of a toy gun in accordance with a further preferred embodiment of the present invention.

Referring to FIGS. 1 to 4, a preferred embodiment of the light reflecting unit of the present invention is depicted. In this preferred embodiment, the light reflecting unit is preferably a triangular prism 600*a*. Preferably, the light source 500 and the triangular prism 600*a* are mounted in close proximity to an outlet end 410 of the launch tube 400 as illustrated in FIGS. 1 to 4. Preferably, the triangular prism 600*a* is positioned directly above the light source 500 of the toy gun 1 as illustrated in FIGS. 1 to 4 such that the light beam emitted from the light source 500 directly shines upward and hits the triangular prism 600*a*. According to this preferred embodiment, the light beam emitted from the light source 500 is preferably reflected by the triangular prism 600*a* at substantially 90 degrees. It should be noted that the light beam reflected by the triangular prism 600*a* will axially align with the soft projectile 70 discharged from the launch tube 400 of the toy gun 1, thereby illuminating the soft projectile 70 as illustrated in FIG. 4.

FIGS. 5 to 10 illustrate a further preferred embodiment of the light reflecting unit of the present invention. In this preferred embodiment, the light reflecting unit is preferably a flippable mirror 600*b*. The flippable mirror 600*b* is positioned beneath the light source 500. Preferably, the flippable mirror 600*b* of this preferred embodiment is hingedly coupled to an elongated guide bar 800 at a hinge point 800*a*. In this preferred embodiment, the guide bar 800 is provided with a sliding slot 810 of an appropriate length having a first end 811 and a second end 813. Preferably, the sliding slot 810 of the guide bar 800 is formed at a rear end section 830 of the guide bar 800. It should be noted that the sliding slot 810 of the guide bar 800 is configured to allow a pair of sliding members 900 to be slidably engaged therewith. In this preferred embodiment, each of the sliding member 900 is provided with an engaging means 910 at one end 900*a*. It should be noted that the engaging means 910 of the sliding member 900 is configured to slidably engage with the sliding slot 810 of the guide bar 800. According to this preferred embodiment, another end 900*b* of the sliding member 900 not engaging with the sliding slot 810 of the guide bar 800 is attached to the rear end portion 335 of the piston 330 of the launch assembly 300 as illustrated in FIG. 6.

In this preferred embodiment, the sliding member 900 is being pulled backwardly when the piston 330 moves rearwardly. It should be noted that the backward movement of the sliding member 900 causes the engaging means 910 of the sliding member 900 to pull the guide bar 800 in a backward direction. Preferably, the engaging means 910 of the sliding member 900 is clasped on the first end 811 of the sliding slot 810 of the guide bar 800 when the guide bar 800 is being pulled backwardly as illustrated in FIG. 6.

Figure 8:
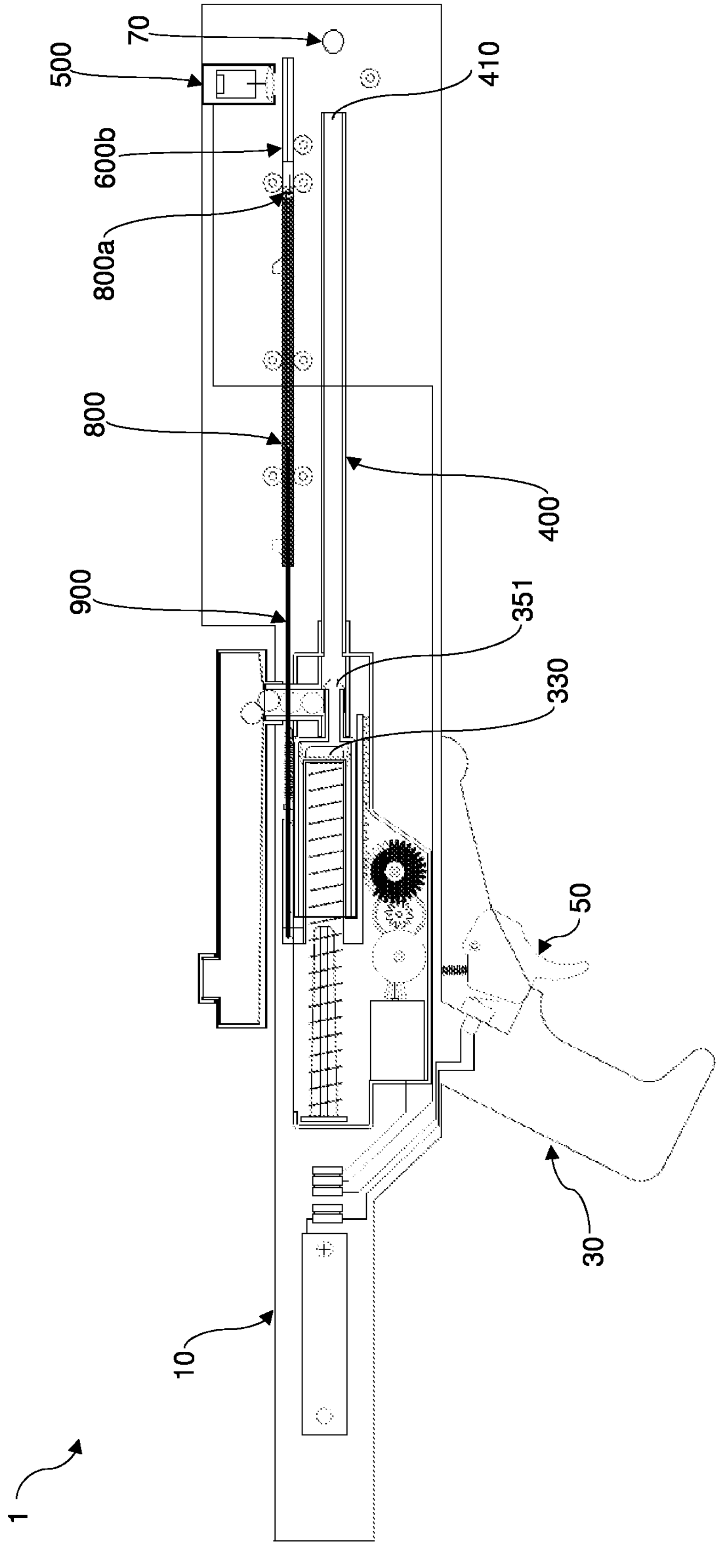
FIG. 8 is a sectional view of a toy gun showing a soft projectile being discharged from a launch tube in accordance with a further preferred embodiment of the present invention.

Referring to FIGS. 7 and 8, it should be noted that when the guide bar 800 moves backwardly, the flippable mirror 600*b* coupled to the hinge point 800*a* is being lifted upwardly from a flipped state to a horizontal position and is pulled backwardly in order to expose the outlet end 410 of the launch tube 400 so as to allow the at least one soft projectile 70 loaded in the launch tube 400 to be discharged from the toy gun 1.

Figure 10:
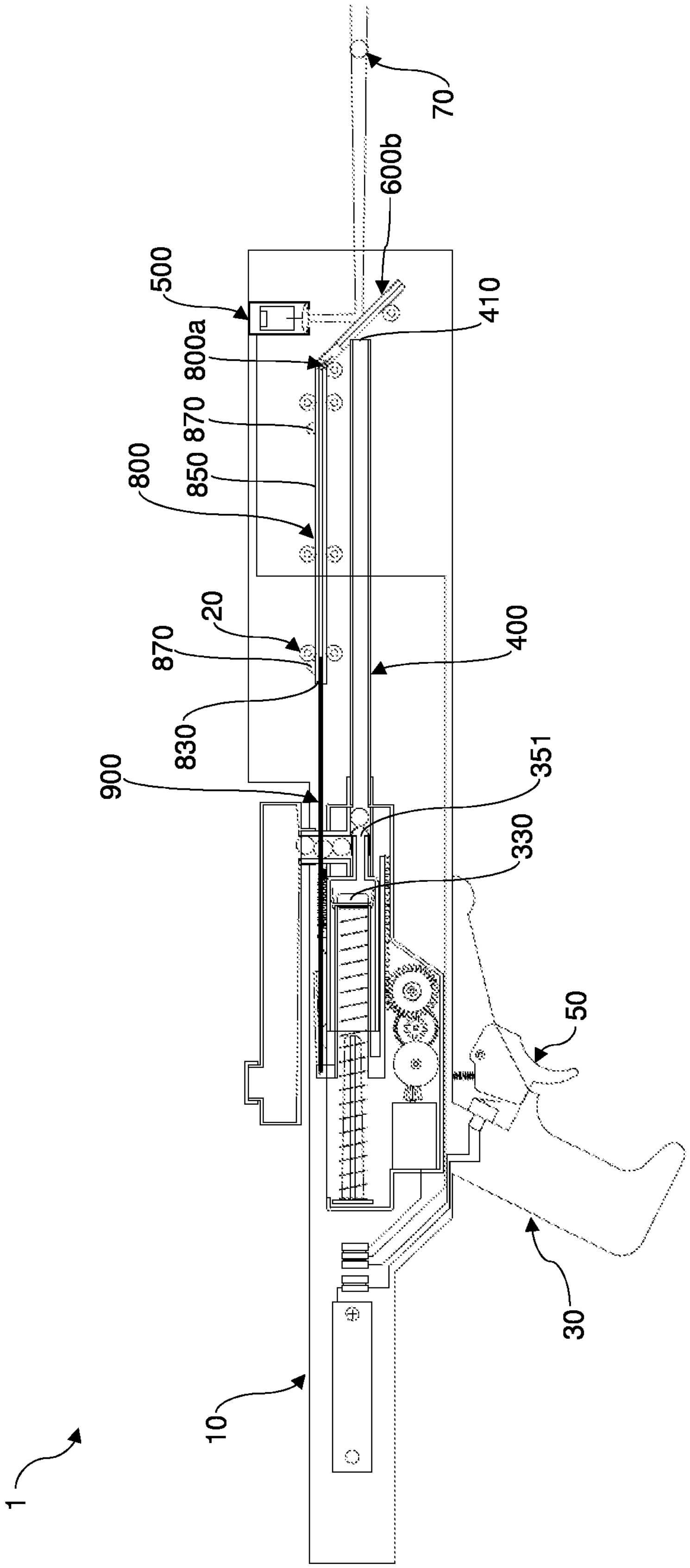
FIG. 10 is a sectional view of a toy gun showing a soft projectile being discharged from a launch tube and the discharged soft projectile is illuminated by a light beam reflected by a light reflecting unit in accordance with a further preferred embodiment of the present invention.

According to this preferred embodiment, when the coil spring 370 changes from a compressed state to a released state, the piston 330 moves in a forward direction. The movement of piston 330 causes the engaging means 910 of the sliding member 900 to slide forwardly along the sliding slot 810 of the guide bar 800 until the engaging means 910 of the sliding member 900 strikes the second end 813 of the sliding slot 810 of the guide bar 800. It should be noted that when the engaging means 910 of the sliding member 900 strikes the second end 813 of the sliding slot 810 of the guide bar 800, the sliding member 900 exerts a pushing force on the guide bar 800 which in turns pushes the guide bar 800 to move in a forward direction, thereby directing the flappable mirror 600*b* to move forward and subsequently flip downward at substantially 45 degrees as illustrated in FIGS. 5 and 10.

It should be noted that the forward movement of the engaging means 910 of the sliding member 900 along the sliding slot 810 of the guide bar 800 introduces a time delay which corresponds to a time interval required for the soft projectile 70 to be completely discharged from the launch tube 400. It will be appreciated that such time delay would ensure that the flippable mirror 600*b* is to be retained at a horizontal position so as to allow the soft projectile 70 to be completely discharged from the launch tube 400.

In this preferred embodiment, the toy gun 1 is provided with a plurality of rollers 20. Preferably, the plurality of rollers 20 are placed around the guide bar 800 and the flippable mirror 600*b* as illustrated in FIG. 5. It should be noted that the plurality of rollers 20 are configured to guide the movements of the guide bar 800 and the flappable mirror 600*b* when the guide bar 800 and the flippable mirror 600*b* are pulled backward or pushed forward by the sliding members 900.

According to this preferred embodiment, the guide bar 800 is provided with at least one bulge member 870 extending outwardly from a top surface 850 of the guide bar 800 as illustrated in FIG. 5. Preferably, the at least one bulge member 870 is positioned proximate the rear end section 830 of the guide bar 800. In this preferred embodiment, the at least one bulge member 870 of the guide bar 800 is configured to restrict the movements of the guide bar 800 so as to prevent the guide bar 800 from being excessively pulled backward or pushed forward by the sliding member 900. It should be noted that the at least one bulge member 870 will be in contact with a vertical wall 11 of the gun body 10 positioned above and proximate the front end 710 of the chamber 700 of the toy gun 1 when the guide bar 800 is pulled backwardly by the sliding member 900 as illustrated in FIG. 7 and when the guide bar 800 is pushed forwardly by the sliding member 900, the at least one bulge member 870 will be in contact with the roller 20 positioned apart from the vertical wall 11 of the gun body 10 as illustrated in FIG. 5 so as to limit the distance travel by the guide bar 800. If desired, the at least one bulge member 870 can be placed in between two rollers 20 so as to restrict the movements of the guide bar 800.

According to this preferred embodiment, the light beam emitted from the light source 500 is preferably reflected by the flippable mirror 600*b* at substantially 90 degrees. It should be noted that the light beam reflected by the flippable mirror 600*b* will axially align with the soft projectile 70 discharged from the launch tube 400 of the toy gun 1, thereby illuminating the soft projectile 70 as illustrated in FIG. 10.

In accordance with each of the preferred embodiments of the present invention, the toy gun 1 is provided with a detachable projectile magazine 90 having an inlet 91 and an outlet 93 as illustrated in FIGS. 1 and 5. According to each of the preferred embodiments, the projectile magazine 90 is positioned outside the gun body 10 and preferably resided on an upper surface 12 of the gun body 10. Preferably, the projectile magazine 90 is configured to hold and contain a plurality of soft projectiles 70. In accordance with each of the preferred embodiments, the outlet 93 of the projectile magazine 90 is configured to be detachably engage with the passage 17 of the gun body 10 as illustrated in FIGS. 1 and 5 so as to allow the soft projectiles 70 contained in the projectile magazine 90 to be loaded into the launch tube 400 through the passage 17. In each of the preferred embodiments of the present invention, the projectile magazine 90 is further provided with a cap 95. It should be noted that the cap 95 of the projectile magazine 90 is configured to be removably engaged with the inlet 91 of the projectile magazine 90 so as to prevent the soft projectiles 70 from dropping out of the projectile magazine 90. By way of example but not limitation, the soft projectiles 70 are preferably transparent jelly bullets or soft crystal bullets or the like.

In each of the preferred embodiments of the present invention, the toy gun 1 is further provided with an audio speaker means. The audio speaker means could be positioned at any suitable location within the gun body 10. It should be noted that the audio speaker means of the toy gun 1 is configured to generate sound effects simulating the actual blaster shot so as to provide a realistic effect which could enhance realism of the toy gun 1 and thus increasing enjoyment and excitement of the shooting game.

The invention being thus described, it will be obvious that the same may be varied in many ways. Such variations are not to be regarded as a departure from the principle and scope of the invention, and all such modifications as would obvious to one skilled in the art intended to be included within the scope of following claims. It should be noted that the described preferred embodiments should be considered in all respects as illustrative, not restrictive and reference should be made to the appended claims for determining the scope of invention.

The invention claimed is:

1. A method of generating glowing projectiles, the method comprising:

activating a propulsion system, operably connected to a launch assembly, such that at least one unitary projectile is discharged from a launch tube defined about a longitudinal axis and connected to the launch assembly; and enabling a light source configured to controllably generate and emit at least one light beam along the longitudinal axis such that the projectile is illuminated thereby at least after the projectile exits an outlet of the launch tube.

2. The method of claim 1, wherein the light beam is projected at least by a light reflecting unit positioned substantially across a diameter of the launch tube from the light source.

3. The method of claim 1, wherein the at least one unitary projectile comprises a soft projectile.

4. The method of claim 1, wherein the at least one unitary projectile comprises a solid projectile.

5. The method of claim 1, wherein the discrete projectile comprises a resilient projectile.

6. The method of claim 1, wherein the light source comprises a laser.

7. The method of claim 1, further connecting the propulsion system and the light source to a power source.

8. The method of claim 7, wherein the power source comprises a battery.

9. The method of claim 1, wherein the propulsion system comprises a motor.

10. A method of generating glowing projectiles, the method comprising:

activating a propulsion system, operably connected to a launch assembly, such that at least one projectile package is discharged from a launch tube defined about a longitudinal axis and operatively connected to the launch assembly; and enabling a light source to generate and emit at least one light beam projected along the longitudinal axis such that the projectile package is illuminated thereby at least after the at least one projectile package exits an outlet of the launch tube.

11. The method of claim 10, wherein the light beam is projected at least by a light reflecting unit positioned substantially across a diameter of the launch tube from the light source.

12. The method of claim 10, wherein the at least one projectile package is of a unitary body construction.

13. The method of claim 10, wherein the at least one projectile package comprises a soft projectile.

14. The method of claim 10, wherein the at least one projectile package comprises a solid projectile.

15. The method of claim 10, wherein the at least one projectile package comprises a resilient projectile.

16. The method of claim 10, wherein the light source comprises a laser.

17. The method of claim 10, further connecting the propulsion system and the light source to a power source.

18. The method of claim 17, wherein the power source comprises a battery.

19. The method of claim 10, wherein the launch assembly comprises a rack and pinion assembly operatively connected to a piston disposed within a cylinder.

20. The method of claim 10, wherein the propulsion system comprises a motor.

* * * * *